United States Patent

Oberg et al.

[11] Patent Number: 5,872,165
[45] Date of Patent: Feb. 16, 1999

[54] COATING COMPOSITION AND METHOD FOR REDUCING ULTRAVIOLET LIGHT DEGRADATION

[75] Inventors: Patricia K. Oberg, Birmingham; Donald L. St. Aubin, Commerce Township; John E. Boisseau, Bloomfield Hills; Walter H. Ohrbom, Hartland Township, all of Mich.

[73] Assignee: BASF Corporation, Southfield, Mich.

[21] Appl. No.: 768,829

[22] Filed: Dec. 18, 1996

[51] Int. Cl.$^6$ ...................................................... C08K 5/34
[52] U.S. Cl. ................................................................ 524/100
[58] Field of Search ............................................. 524/100

[56] References Cited

U.S. PATENT DOCUMENTS

| | | | |
|---|---|---|---|
| 4,153,780 | 5/1979 | Narita et al. | 528/198 |
| 5,032,498 | 7/1991 | Rody et al. | 430/512 |
| 5,106,891 | 4/1992 | Valet . | |

*Primary Examiner*—Kriellion S. Morgan
*Attorney, Agent, or Firm*—Anne Gerry Sabourin

[57] ABSTRACT

The present invention relates to a coating composition containing a combination of ultraviolet light absorbing compounds, one or more of which is bound to a polymer, and a method for reducing degradation of coating compositions due to ultraviolet light exposure.

7 Claims, No Drawings

COATING COMPOSITION AND METHOD FOR REDUCING ULTRAVIOLET LIGHT DEGRADATION

BACKGROUND OF THE INVENTION

1. Field of the Invention

The present invention relates to a coating composition containing a combination of polymer-bound ultraviolet light absorbing compounds.

2. Discussion of the Prior Art

Ultraviolet absorbers are used in coating compositions to reduce the degradation of the coating resulting from the effects of atmospheric oxygen, moisture and ultraviolet light. The degradation is manifest in cracking, loss of gloss, changes in shade, delamination and formation of bubbles in the cured coating films. It is known that stabilizers, such as ultraviolet (uv) absorbers, substantially prevent or minimize such damage in coatings.

Examples of ultraviolet light absorbers include benzotriazoles, 2-hydroxybenzophenones oxanilide, and 2-hydroxyphenyltriazines. Benzotriazoles are highly effective ultraviolet light absorbers over a broad spectrum, but these compounds are often not stable and may migrate to other coating layers in a multi-layer coating system or may chemically degrade in the coating composition, thereby losing efficacy as ultraviolet light absorbers. Triazine ultraviolet absorber compounds are more chemically stable, but do not have the range of ultraviolet light absorption that the benzotriazoles have.

It is an object of the present invention to improve the stability of ultraviolet light absorbers in a coating composition, to enhance ultraviolet light absorption and to reduce degradation of a coating composition due to ultraviolet light exposure.

SUMMARY OF THE INVENTION

According to the present invention, a polymer-bound benzotriazole or polymer-bound triazine is incorporated into a coating composition in combination with at least one other ultraviolet light absorber to improve resistance of a coating composition to ultraviolet light degradation. The polymer-bound benzotriazole or polymer-bound triazine prevents migration of the benzotriazole or triazine from the surface coating and increases its chemical stability in a coating composition, thus providing longer lasting ultraviolet protection. The polymer-bound benzotriazole and polymer-bound triazine may be used in combination with each other, or either one may be used in combination with other ultraviolet absorbers such as non-polymeric benzotriazoles, non-polymeric triazines, 2-hydroxybenzophenone, oxanilide, and mixtures thereof. The benzotriazole and triazine can be added as separate polymers or can be polymerized onto a single polymeric compound. The benzotriazole or triazine can be polymerized onto a polymeric component of the coating composition, whether it is a principal resin, a pigment grind resin, crosslinking agent, rheology modifier, flow additives, or other polymeric components of the coating composition. In a preferred embodiment the benzotriazole or triazine is polymerized onto the principal crosslinkable resin.

DETAILED DESCRIPTION OF THE INVENTION

Polymer-bound triazine and polymer-bound benzotriazole are incorporated into a coating composition in combination with each other, or used individually with one or more additional ultraviolet light absorbers, to provide longer lasting ultraviolet protection in a coating composition. When a polymer-bound benzotriazole is employed as a UV absorber, it is combined with compounds selected from the group consisting of triazines which may be polymeric or non-polymeric compounds, non-polymeric benzotriazoles, 2-hydroxybenzophenone compounds, oxanilides, and mixtures thereof. Where a polymer bound triazine is used it is combined with polymer-bound or non-polymer bound benzotriazoles, non-polymer bound triazines or other UV absorbers, such as 2-hydroxybenzophenone compounds, oxanilides, and mixtures thereof. The preferred combinations of UV absorber include polymer-bound benzotriazole and triazine which may be polymer-bound or non-polymer bound.

A compound comprising a polymer-bound benzotriazole useful in the present invention is shown in formula (Ia):

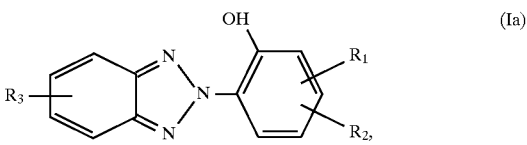

wherein, in the compounds of the formula (Ia), $R_1$, $R_2$ and $R_3$ can be hydrogen, but at least one of the radicals $R_1$ and $R_2$ must be other than hydrogen. Additionally, $R_1$, $R_2$ and $R_3$ can be halogen, hydroxyl halogen methyl, alkyl having 1 to 18 carbons, phenyl alkyl having 1 to 4 carbons in the alkyl moiety, hydroxy alkyl having 1 to 24 carbon atoms in the alkyl chain, such as methyl, ethyl, propyl, butyl, hexyl, octyl, nonyl, dodecyl, tetradecyl, hexadecyl, octadecyl, nonadecyl and eicosyl and also corresponding branched isomers, alkyl substituted by —COOH, —COOY$_8$, —CONH$_2$, —CONHY$_9$, —CONY$_9$Y$_{10}$, —NH$_2$, —NHY$_9$, —NY—$_9$Y$_{10}$, —NHCOY$_{11}$, —CN, and/or —OCOY$_{11}$, which has 4 to 20 carbon atoms, is interrupted by one or more oxygen atoms and is unsubstituted or substituted by hydroxyl or alkoxy having 1 to 12 carbon atoms, alkenyl having 3 to 6 carbon atoms, glycidyl, cyclohexyl which is unsubstituted or substituted by hydroxyl, alkyl having 1 to 4 carbon atoms and/or —OCOY$_{11}$, phenylalkyl which has 1 to 5 carbon atoms in the alkyl moiety and is unsubstituted or substituted by hydroxyl, chlorine and/or methyl, —COY$_{12}$ or —SO$_2$Y$_{13}$, or, if u is 2, Y$_2$ is alkylene having 2 to 16 carbon atoms, alkylene having 4 to 12 carbon atoms, xylylene, alkylene which has 3 to 20 carbon atoms, is interrupted by one or more —O— atoms and/or substituted by hydroxyl, —CH$_2$CH(OH)CH$_2$—O—Y$_{15}$, —OCH$_2$CH (OH)CH$_2$, —CO—Y$_{16}$—CO—, —CO—NH—Y$_{17}$—NH—CO—, or —(CH$_2$)$_m$—CO$_2$—Y$_{18}$—OCO—(CH$_2$)$_m$, in which m is 1,2 or 3, Y$_8$ is alkyl having 1 to 18 carbon atoms, amine, alkyl amine or cycloalkyl amine, wherien the alkyl or cycloalkyl has up to 6 carbon atoms, alkenyl having 3 to 18 carbon atoms, alkyl which has 3 to 20 carbon atoms, is interrupted by one or more oxygen or sulfur atoms or —NT$_6$— and/or is substituted by hydroxyl, alkyl which has 1 to 4 carbon atoms and is substituted by —P(O) (OY$_{14}$)$_2$, —NY$_9$Y$_{10}$ or —OCOY$_{11}$ and/or hydroxyl, alkenyl having 3 to 18 carbon atoms, glycidyl, or phenylalkyl having 1 to 5 carbon atoms in the alkyl moiety, Y$_9$ and Y$_{10}$ independently of one another are alkyl having 1 to 12 carbon atoms, alkoxyalkyl having 3 to 12 carbon atoms, dialkylaminoalkyl having 4 to 16 carbon atoms or cyclohexyl having 5 to 12 carbon atoms, or Y$_9$ and Y$_{10}$ together are alkylene, oxalkylene or azaalkylene having in each case 3 to 9 carbon atoms, Y$_{11}$ is alkyl having 1 to 18 carbon atoms, alkenyl having 2 to 18 carbon atoms or phenyl, $Y_{12}$ is alkyl having 1 to 18 carbon atoms, alkenyl having 2 to 18 carbon atoms, phenyl, alkoxy having 1 to 12 carbon atoms, phenoxy, alkylamino having 1 to 12 carbon atoms or phenylamino, $Y_{13}$ is alkyl having 1 to 18 carbon atoms, phenyl or alkyphenyl having 1 to 8 carbon atoms in the alkyl radical, $Y_{14}$ is alkyl having 1 to 12 carbon atoms or phenyl, $Y_{15}$ is alkylene having 2 to 10 carbon atoms, pheneylene or a group —phenylene—M—phenylene— in which M is —O—, —S—, —$SO_2$—, —$CH_2$—or —$C(CH_3)_2$—, $y_{16}$ is alkylene, oxaalkylene or thiaalkylene having in each case 2 to 10 carbon atoms, phenylene or alkenylene having 2 to 6 carbon atoms, $Y_{17}$ is alkylene having 2 to 10 carbon atoms, phenylene or alkylphenlene having 1 to 11 carbon atoms in the alkyl moiety, and $Y_{18}$ is alkylene having 2 to 10 carbon atoms or alkylene which has 4 to 20 carbon atoms and is interrupted once or several times by oxygen.

$R_1$ may be phenylalkyl having 1 to 4 carbon atoms in the alkyl moiety, for example benzyl, and can also be cycloalkyl having 5 to 8 carbon atoms, for example cyclopentyl, cyclohexyl and cyclooctyl, or a radical of the formula

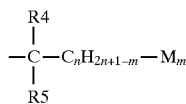

in which $R_4$ and $R_5$ independently of one another are alkyl having in each case 1 to 5 carbon atoms, in particular methyl, or $R_4$ together with the radical $C_nH_{2n+1-m}$, forms a cyclolakyl radical having 5 to 12 carbon atoms, for example cyclohexyl, cyclooctyl and cyclodecyl. M is a radical of the formula —$COOR_6$ in which $R_6$ is hydrogen, or alkyl having 1 to 12 carbon atoms, or alkoxyalkyl having 1 to 20 carbon atoms in each of the alkyl and the alkoxy moieties. Suitable alkyl radicals $R_6$ are those enumerated for $R_1$. Examples of suitable alkoxyalkyl groups are —$C_2H_4OC_2H_5$, —$C_2H_4OC_8H_{17}$ and —$C_4H_8OC_4H_9$. As phenylalkyl having 1 to 4 carbon atoms, $R_6$ is, for example, benzyl, cumyl, α-methylbenzyl or phenylbutyl.

At least one of the radicals $R_1$ and $R_2$ must be other than hydrogen.

Alternatively, a benzotriazole useful in the present invention has the following formula:

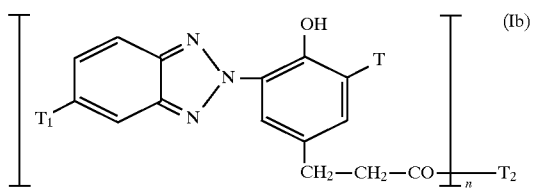

In the compounds of the formula (Ib) T is hydrogen or alkyl having 1 to 6 carbon atoms, such as methyl and butyl, $T_1$ is hydrogen, chlorine or alkyl or alkoxy having in each case 1 to 4 carbon atoms, for example methyl, methoxy and butoxy, and n is 1 or 2. If n is 1, $T_2$ is chlorine or a radical of the formula —$OT_3$ or

and if n is 2, $T_2$ is a radical of the formula

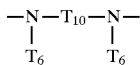

or—O—$T_9$—O—, where $T_3$ is hydrogen, alkyl which has 1 to 18 carbon atoms and is unsubstituted or substituted by 1 to 3 hydroxyl groups or by —$OCOT_6$, alkyl which has 3 to 18 carbon atoms, is interrupted once or several times by —O—or—$NT_6$— and is unsubstituted or substituted by hydroxyl or —$OCOT_6$. Examples of $T_3$ as cycloalkyl include cycloalkyl having 5 to 12 carbon atoms, such as cyclopentyl, cyclohexyl or cyclooctyl and is unsubstituted or substituted by hydroxyl and/or alkyl having 1 to 4 carbon atoms in the alkyl moiety, for example benzyl or phenylbutyl. $T_3$ can also be alkenyl having 2 to 18 carbon atoms. Suitable alkenyl radicals are derived from the alkyl radicals enumerated in the definitions of $R_1$. These alkenyl radicals can be substituted by hydroxyl. Examples of $T_3$ as phenylalkyl are benzyl, phenylethyl, cumyl, α-methylbenzyl or benzyl. $T_3$ can also be a radical of the formula —$CH_2C$—H(OH)—$T_7$ or

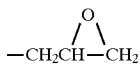

$T_4$ and $T_5$ independently of one another are hydrogen, alkyl having 1 to 18 carbon atoms, alkyl which has 3 to 18 carbon atoms and is interrupted once or several times by —O—or $NT_6$—, cycloalkyl having 5 to 12 carbon atoms, for example. phenyl, phenyl which is substituted by alkyl having 1 to 4 carbon atoms, alkenyl having 3 to 8 carbon atoms, phenylalkyl having 1 to 4 carbon atoms in the alkyl moiety or hydroxyalkyl having 2 to 4 carbon atoms, $T_6$ is hydrogen, alkyl having 1 to 18 carbon atoms, cycloalkyl having 5 to 12 carbon atoms, alkenyl having 3 to 8 carbon atoms, phenyl, phenyl which is substituted by alkyl having 1 to 4 carbon atoms, phenylalkyl having 1 to 4 carbon atoms in the alkyl moiety, $T_7$ is hydrogen, alkyl having 1 to 18 carbon atoms, phenyl which is unsubstituted or substituted by hydroxyl, phenylakyl having 1 to 4 carbon atoms in the alkyl moiety, or —$CH_2OT_8$, $T_8$ is alkyl having 1 to 18 carbon atoms, alkenyl having 3 to 8 carbon atoms, cycloalkyl having 5 to 10 carbon atoms, phenyl, phenyl which is substituted by alkyl having 1 to 4 carbon atoms, or phenylalkyl having 1 to 4 carbon atoms in the alkyl.

The 2-hydroxypenyltriazine has the formula

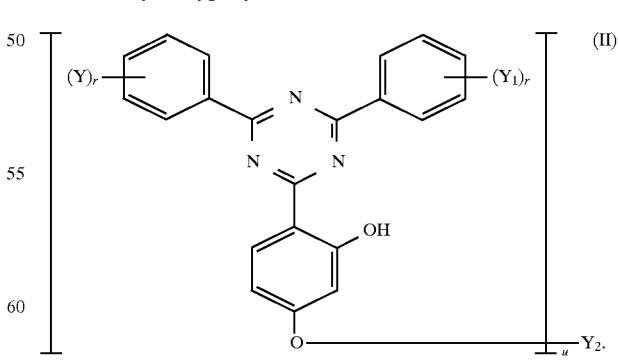

In the compounds of the formula (II), u is 1 to 2 and r is an integer from 1 to 3, the substituted $Y_1$ independently of one another are hydrogen, hydroxyl halogenomethyl, alkyl having 1 to 12 carbon atoms, alkoxy having 1 to 19 carbon atoms, phenoxy which is unsubstituted or substituted by hydroxyl, alkoxy having 1 to 18 carbon atoms, or halogen, or is substituted by alkyl or alkoxy having in each case 1 to 18 carbon atoms or halogen, alkyl which has 1 to 12 carbon atoms and is substituted by —COOH, —COOY$_8$, —CONH$_2$, —CONHY$_9$, —CONY$_9$Y$_{10}$, —NH$_2$, —NHY$_9$, —NY—$_9$Y$_{10}$, —NHCOY$_{11}$, —CN and/or —OCOY$_{11}$, which has 4 to 20 carbon atoms, is interrupted by one or more oxygen atoms and is unsubstituted or substituted by hydroxyl or alkoxy having 1 to 12 carbon atoms, alkenyl having 3 to 6 carbon atoms, glycidyl, cyclohexyl which is unsubstituted or substituted by hydroxyl, alkyl having 1 to 4 carbon atoms and/or —OCOY$_{11}$, phenylalkyl which has 1 to 5 carbon atoms in the alkyl moiety and is unsubstituted or substituted by hydroxyl, chlorine and/or methyl, —COY$_{12}$ or ——SO$_2$Y$_{13}$, or, if u is 2, Y$_2$ is alkylene having 2 to 16 carbon atoms, alkylene having 4 to 12 carbon atoms, xylene, alkylene which has 3 to 20 carbon atoms, is interrupted by one or more —O— atoms and/or substituted by hydroxyl, —CH$_2$CH(OH)CH$_2$—O—Y$_{15}$, —OCH$_2$CH(OH)CH$_2$, —CO—Y$_{16}$—CO—, —CO—NH—Y$_{17}$—NH—CO—, or —(CH$_2$)$_m$—CO$_2$—Y$_{18}$—OCO—(CH$_2$)$_m$, in which m is 1,2 or 3, Y$_8$ is alkyl having 1 to 18 carbon atoms, amine, alkyl amine or cycloalkyl amine wherein the alkyl or cycloalkyl group has up to six carbon atoms, alkenyl having 3 to 18 carbon atoms, alkyl which has 3 to 20 carbon atoms, is interrupted by one or more oxygen or sulfur atoms or —NT$_6$— and/or is substituted by hydroxyl, alkyl which has 1 to 4 carbon atoms and is substituted by —P(O) (OY$_{14}$)$_2$, —NY$_9$Y$_{10}$or —OCOY$_{11}$L and/or hydroxyl, alkenyl having 3 to 18 carbon atoms, glycidyl, or phenylalkyl having 1 to 5 carbon atoms in the alkyl moiety, Y$_9$ and Y$_{10}$ independently of one another are alkyl having 1 to 12 carbon atoms, alkoxyalkyl having 3 to 12 carbon atoms, dialkylaminoalkyl having 4 to 16 carbon atoms or cyclohexyl having 5 to 12 carbon atoms, or Y$_9$ and Y$_{10}$ together are alkylene, oxalkylene or azaalkylene having in each case 3 to 9 carbon atoms, Y$_{11}$ is alkyl having 1 to 18 carbon atoms, alkenyl having 2 to 18 carbon atoms or phenyl, Y$_{12}$ is alkyl having 1 to 18 carbon atoms, alkenyl having 2 to 18 carbon atoms, phenyl, alkoxy having 1 to 12 carbon atoms, phenoxy, alkylamino having 1 to 12 carbon atoms or phenylamino, Y$_{13}$ is alkyl having 1 to 18 carbon atoms, phenyl or alkyphenyl having 1 to 8 carbon atoms in the alkyl radical, Y$_{14}$ is alkyl having 1 to 12 carbon atoms or phenyl, Y$_{15}$ is alkylene having 2 to 10 carbon atoms, pheneylene or a group —phenylene—M— phenylene— in which M is —O—, —S—, —SO$_2$—, —CH$_2$—or —C(CH$_3$)$_2$—, Y$_{16}$ is alkylene, oxaalkylene or thiaalkylene having in each case 2 to 10 carbon atoms, phenylene or alkenylene having 2 to 6 carbon atoms, Y$_{17}$ is alkylene having 2 to 10 carbon atoms, phenylene or alkylphenlene having 1 to 11 carbon atoms in the alkyl moiety, and Y$_{18}$ is alkylene having 2 to 10 carbon atoms or alkylene which has 4 to 20 carbon atoms and is interrupted once or several times by oxygen.

The 2-hydroxybenzophenone has the formula

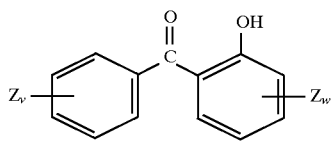

In the formula v is an integer from 1 to 3 and w is 1 or 2 and the substituents Z independently of one another are hydrogen, alkyl, alkoxy or alkylthio having in each case 1 to 22 carbon atoms, phenoxy or phenylthio.

The polymer-bound ultraviolet light absorber compounds are reacted onto polymers by addition polymerization, condensation or rearrangement reactions, or grafting. The UVA compounds may be reacted onto the same polymer or separate polymers. Examples of polymers in which it can be incorporated are:

polyolefins, polyacrylates, polymethacrylates, polystyrene, derivatized polystyrenes, polyurethanes, epoxy, polyester, polyether, alkyd and carbamate polymers, and mixtures thereof.

The polymer-bound benzotriazole is effective for absorbing UV light in the range of about 200 nm to about 450 nm, particularly in the range of 240 nm to 420 nm. In the preferred embodiment, the benzotriazole is polymerized onto the principal resin or crosslinker used in the coating composition. Alternatively, the benzotriazole is polymerized onto a pigment grind resin, or other compound used in the coating composition.

The polymer-bound ultraviolet light absorber is incorporated into the coating composition in an amount between 0.1 and 30.0 percent by weight, preferably between 1.0 and 10.0 percent by weight, based on total coating composition weight.

The invention is illustrated by the following nonlimiting examples.

EXAMPLES

Example 1

Acrylic Polymer-Bound Benzotriazole

Polymer-bound Ultraviolet Light Absorber

A polymer-bound ultraviolet light absorber containing 2.0% benzotriazole, based on total coating solids, was prepared by polymerizing 28.4 grams of a benzotiazole, sold under the trademark Norbloc™ 7966, available from Noramco, Inc. onto 1514.3 grams of a hydroxy functional carbamate resin, sold under the trademark Ureclear®, commercially available from BASF Corporation. The hydroxy functional carbamate resin had a hydroxy equivalency of 1650 g/equivalent at 95% non-volatile content.

Example 2

Coating Composition Containing Polymer-Bound Benzotiazole

| Ingredient | Amount* |
| --- | --- |
| Acrylic resin from Ex. 1 | 75.51 |
| ²Resimine 747 Aminoplast | 20.66 |
| Acid Catalyst | 1.00 |
| Fumed Silica Rheoloyy Control Additive | 1.31 |
| Flow Control Additive | 0.20 |
| Adhesion promoter | 1.32 |
| Total | 100.00 |

*All weights are in percent by weight based on total solid content of coating.

Example 3

Coating Composition Containing Polymer-bound Benzotriazole and Triazine Mixture

To the coating composition in Example 2 were added 2.1 grams of 2-hydroxyphenyl triazine. The triazine was used in a 72% solution of triazine and solvent. The resultant coating composition comprised 1% by weight based on coating composition solids content.

Example 4

Coating Composition Containing Polymer-bound Benzotriazole, Triazine and Hindered Amine Light Stabilizer (HALS)

To the coating composition in Example 2 was added 2-hydroxyphenyl triazine in an amount of 2.1 grams and a hindered amine light stabilizer (HALS) sold under the trademark Sandivar 3058 and available from Sandoz, in an amount of 1.5% based on total solids content of the coating composition. The HALLS is used in a 95% solution, where the solution comprises HALS and solvent.

I claim:

1. A coating composition comprising
  a) a crosslinkable principal resin and
  b) a combination of ultraviolet light absorbing compounds, wherein at least one ultraviolet light absorber is a polymer-bound ultraviolet light absorber, bound to a polymer selected from the group consisting of polyolefin, polyacrylate, polymethacrylate, polystyrene, derivatized polystyrene, polyurethane, epoxy, polyester, polyether, alkyd and carbamate polymers, and mixtures thereof, and the ultraviolet light absorber is selected from the group consisting of polymer-bound benzotriazoles having the formula:

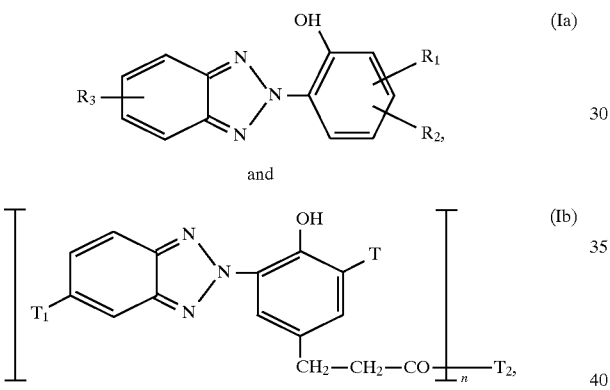

and mixtures thereof, used in combination with a non-polymer bound ultraviolet light absorber and mixtures thereof, wherein in the compounds of the formula (Ia), $R_1$, is selected from the group consisting of hydrogen, alkyl having 1 to 24 carbon atoms, phenylalkyl having 1 to 4 carbon atoms in the alkyl moiety, and $R_2$ is selected from the group consisting of hydrogen, halogen, alkyl having 1 to 18 carbons, phenyl alkyl having 1 to 4 carbons in the alkyl moiety, $R_3$ is selected from the group consisting of hydrogen, chlorine, alkyl having 1 to 4 carbon atoms; with at least one of the radicals $R_1$ and $R_2$ being other than hydrogen;

in formula (Ib) T is hydrogen or alkyl having 1 to 6 carbon atoms, $T_1$ is hydrogen, chlorine or alkyl hating 1 to 4 carbon atoms, and n is 1 or 2, when n is 1, $T_2$ is chlorine or a radical of the formula —$OT_3$, where $T^3$ is hydrogen, alkyl which has 1 to 18 carbon atoms and is unsubstituted or substituted by 1 to 3 hydroxyl groups; alkyl which has 3 to 18 carbon atoms interrupted once or several times by —O— and is unsubstituted or substituted by hydroxyl; alkenyl which has 2 to 18 carbon atoms and is unsubstituted or substituted by hydroxyl; phenylalkyl having 1 to 4 carbon atoms in the alkyl moiety, or a radical of the formula —$CH_2CH(OH)$—$T_7$ or glycidyl;

where $T_7$ is hydrogen, alkyl having 1 to 18 carbon atoms, phenyl which is unsubstituted or substituted by hydroxyl; and if n is 2, $T_2$ is a radical of the formula —O—$T_9$—O—, $T_9$ is alkylene having 2 to 8 carbon atoms, alkenylene having 4 to 8 carbon atoms, cyclohexylene, alkylene which has 2 to 18 carbon atoms and is interrupted once or several times by —O—.

2. The coating composition of claim 1 wherein the combination of ultraviolet light absorbing compounds further comprises a polymeric light absorbing compound having the formula:

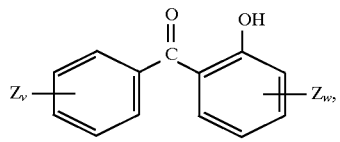

where v is an integer from 1 to 3 and w is 1 or 2 and the substituents Z independently of one another are hydrogen, halogen, hydroxy or alkoxy having 1 to 12 carbon atoms.

3. The coating composition of claim 1 wherein the ultraviolet absorbing compounds are reacted with a polymeric component of the coating composition, selected from the group consisting of a principal resin, a crosslinker, and mixtures thereof.

4. The coating composition of claim 1 wherein the polymeric principal resin is selected from the group consisting of acrylate, methacrylate, urethane, carbamate, polyester, polyether, polystyrene, derivatized polystyrene, polyolefins, alkyd, and epoxy polymeric resins, and mixtures thereof.

5. The coating composition of claim 1 further comprising a crosslinker selected from the group consisting of isocyanates, ureas, aminoplasts, carbamates and mixtures thereof.

6. The coating composition of claim 1 wherein the polymer bound ultraviolet light absorber is a 2-hydroxyphenylbenzotriazole copolymerized with a principal acrylate resin having hydroxy functionality and the coating composition includes an aminoplast crosslinker.

7. The coating composition of claim 1 wherein the coating is a clearcoat coating composition.

* * * * *

UNITED STATES PATENT AND TRADEMARK OFFICE
CERTIFICATE OF CORRECTION

PATENT NO. : 5,872,165
DATED : Feb. 16, 1999
INVENTOR(S) : Oberg et al.

It is certified that error appears in the above-identified patent and that said Letters Patent is hereby corrected as shown below:

Column 7, line 58, after "alkyl", before "1", please delete "hating", and substitute therefor - -having- -;

Signed and Sealed this

Eighth Day of May, 2001

*Attest:*

NICHOLAS P. GODICI

*Attesting Officer*     Acting Director of the United States Patent and Trademark Office